(12) United States Patent
Brouwer

(10) Patent No.: US 7,120,448 B2
(45) Date of Patent: Oct. 10, 2006

(54) METHOD AND SYSTEM OF LINK CONTROL

(75) Inventor: Frank Brouwer, GA Enschede (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 88 days.

(21) Appl. No.: 10/474,062

(22) PCT Filed: Apr. 6, 2002

(86) PCT No.: PCT/SE02/00693

§ 371 (c)(1),
(2), (4) Date: Apr. 1, 2004

(87) PCT Pub. No.: WO02/082685

PCT Pub. Date: Oct. 17, 2002

(65) Prior Publication Data

US 2004/0157618 A1     Aug. 12, 2004

(30) Foreign Application Priority Data

Apr. 6, 2001    (SE) .................................... 0101281

(51) Int. Cl.
*H04Q 7/20* (2006.01)

(52) U.S. Cl. ..................... 455/453; 455/450; 455/451; 455/432.1; 455/452.2; 455/509; 455/516; 455/522; 370/318; 370/329; 370/331; 370/332; 370/333

(58) Field of Classification Search ........ 455/450–453, 455/455, 509, 516, 522, 524; 370/318, 329, 370/331, 332, 333, 334, 335
See application file for complete search history.

(56) References Cited

U.S. PATENT DOCUMENTS

| | | | |
|---|---|---|---|
| 5,379,448 A * | 1/1995 | Ames et al. ................. 455/524 |
| 5,722,051 A * | 2/1998 | Agrawal et al. .............. 455/69 |
| 6,298,242 B1 * | 10/2001 | Schiff .......................... 455/522 |
| 6,308,082 B1 * | 10/2001 | Kronestedt et al. ....... 455/67.11 |
| 6,317,600 B1 * | 11/2001 | Salonaho et al. ........... 455/453 |
| 6,330,462 B1 * | 12/2001 | Chen .......................... 455/572 |
| 6,374,117 B1 * | 4/2002 | Denkert et al. ............. 455/522 |
| 6,643,813 B1 * | 11/2003 | Johansson et al. .......... 714/748 |
| 6,760,303 B1 * | 7/2004 | Brouwer ...................... 370/229 |
| 6,859,446 B1 * | 2/2005 | Gopalakrishnan et al. .. 370/335 |
| 2002/0154610 A1 * | 10/2002 | Tiedemann et al. ......... 370/329 |

FOREIGN PATENT DOCUMENTS

WO          98/24199 A2    6/1998

\* cited by examiner

*Primary Examiner*—Steve M. D'Agosta
(74) *Attorney, Agent, or Firm*—Nixon & Vanderhye, P.C.

(57) ABSTRACT

The present invention relates to retransmissions in a communications system and more especially it relates to link load control in a cellular mobile radio system particularly in a Universal Mobile Telecommunications System, UMTS. BLER targets are set depending on load.

23 Claims, 3 Drawing Sheets

METHOD AND SYSTEM OF LINK CONTROL

This application is the US national phase of international application PCT/SE02/00693 filed 6 Apr. 2002, which designated the US. PCT/SE02/00693 claims priority to SE Application No. 0101281-4 filed 06 Apr. 2001. The entire contents of these applications are incorporated herein by reference.

TECHNICAL FIELD OF THE INVENTION

The present invention relates to retransmissions in a communications system, and more especially it relates to link load control in a cellular mobile radio system, particularly to a Universal Mobile Telecommunications System, UMTS or WCDMA system.

BACKGROUND AND DESCRIPTION OF RELATED ART

Retransmission of data to or from a mobile station, MS, or user equipment, UE, is previously known. If data is received in error, it is requested for retransmission. If errors are frequent, data is requested for retransmission frequently. When the relative amount of transmissions that are retransmissions of previously transmitted data increases the effective user data rate reduces, for a constant channel data rate.

Increasing transmission power can often reduce transmission errors. Consequently, increasing transmission power can reduce the relative amount of retransmissions. Correspondingly, transmission power can be reduced if the relative amount of transmission errors is sufficiently small.

U.S. Pat. No. 5,461,639 describes forward link power control in a CDMA system where error statistics are collected. The error rate is compared to a threshold. If the error rate exceeds the threshold, transmission power is increased. A code selector determines at which redundancy level to transmit. For each level of redundancy, the selector maintains a predetermined target error rate.

International Patent Application WO0013362 describes a method and device for adapting a transmission data rate or a transmitter power to the transmission quality of a transmission channel.

A channel data rate that gives an acceptable error rate at a given signal to noise ratio is selected. Transmission power is controlled.

It is also known to use medium access control and radio link control layers of a UMTS protocol structure in acknowledged mode for dedicated channels and to broadcast system information.

3$^{rd}$ Generation Partnership Project (3GPP): *Technical Specification Group Radio Access Network, Physical Layer Procedures*, 3G TS 25.331 v3.5.0, France, December 2000, specifies an RRC protocol. Section 8.1.1 describes broadcast of system information.

3$^{rd}$ Generation Partnership Project (3GPP): *Technical Specification Group Radio Access Network, Physical Layer Procedures*, 3G TS 25.322 v3.5.0, France, December 2000, specifies the RLC protocol. The RLC layer provides acknowledged data transfer service.

3$^{rd}$ Generation Partnership Project (3GPP): *Technical Specification Group Radio Access Network, Physical Layer Procedures*, 3G TS 25.301 v3.6.0, France, September 2000, specifies in chapter 5 Radio Interface Protocol Architecture of a UMTS system.

None of the cited documents describes a method and system of link control where error targets are selected as a function of transmission load in an ARQ scheme of a radio communications system.

BRIEF SUMMARY

In a power and interference limited system transmission power cannot be increase beyond all limits. For a high system traffic load, available power for each user is more restricted than at a low system traffic load.

Perceived quality to an individual user needs to be balanced to overall system performance. Using only one fixed block error rate target, or one or more block error rate targets independent of traffic load, results in a too low perceived quality at low traffic load and a reduced throughput due to traffic being barred during high traffic load.

Consequently, an object of this invention is to increase perceived quality and reduce delay as perceived by a user during low traffic load.

It is also an object to increase system throughput during high traffic load.

A further object is to present a system and method of communicating load control commands and block error rate targets between various system elements.

Finally, it is an object to adaptively control link load using double loops including link load estimates and targets for transmission power control.

These objects are met by a method and system of retransmissions such that target block error rate is determined in relation to traffic load.

A first embodiment meets the objects for uplink load control with load measurements in a base station, BS, or Node B and load control in a radio network controller, RNC, communicating transmission power control targets, determined from block error rate targets, to the BS/Node B to be used for uplink transmission power control of a user equipment, UE. The block error rate targets, BLER targets, can be either determined to be the same for all connections or determined individually on a link by link basis.

A second embodiment meets the objects for downlink load control with load measurements in a BS/Node B and load control in an RNC by communicating a set of BLER targets to the user equipment and depending on the load situation, which BLER target to use within the set.

According to a third embodiment for downlink load control, only BLER targets to be considered by the UE are communicated to it and not an entire set of BLER targets.

As with uplink BLER targets, downlink BLER targets can be determined individually for each connection, if more than one, of a UE or only one BLER targets is determined for all one or more connections of a UE.

The invention is particularly well suited for high-speed TCP connections interconnecting the Internet and a user equipment.

Preferred embodiments of the invention, by way of examples, are described in detail with reference to the accompanying drawings below.

DESCRIPTION OF PREFERRED EMBODIMENTS

Figure 1:
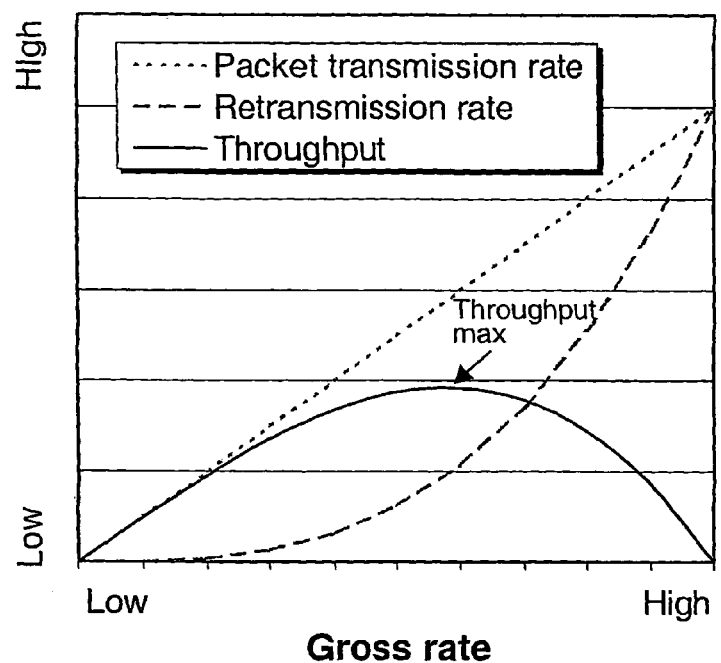
FIG. 1 displays throughput versus channel data rate for an ARQ system, according to the invention.

Wireless systems, in particular, reach their highest system throughput when a total amount of transmitted packets partly includes retransmissions of previously transmitted packets. In FIG. 1, the highest rate with which packets are transmitted on the channel, the packet transmission rate, and a corresponding retransmission rate are schematically depicted versus raw channel bit rate, the gross rate. The packet transmission rate increases linearly with the gross rate. As the gross rate increases, transmission errors will be more frequent and the relative amount of retransmissions increases, everything else being equal. As the retransmission rate approaches the transmission rate for successively higher gross rates, the throughput approaches zero. According to the schematic and exemplary diagram of FIG. 1, there is a maximum throughput when approximately one third of all transmissions are retransmissions. Preferably, it is less than one third in a running system. FIG. 1 only illustrates an exemplary situation.

In general, the fraction of retransmissions for which an optimum throughput is achieved depends on various parameters. One of these parameters is the block error rate, BLER. With reference to FIG. 1, as raw channel bit rate (the abscissa) increases transmitted bit energy decreases and, as a consequence, bits transmitted at a high raw bit rate, the gross rate, are more error prone. Therefore, a block or a packet being composed of a number of bits will also be more error prone as the gross rate increases. At the receiving end errors are detected by means of error detecting codes, well known in the art.

When automatic repeat request, ARQ, is made use of, as is the case in a WCDMA system, a packet or block detected to be in error is requested for retransmission. This request could be in the form of a negative acknowledgement, when an error is detected, or an omitted positive acknowledgement. The greater the fraction of packets detected to be in error, the higher the retransmission rate.

As can be seen from the simplified diagram in FIG. 1, when less than the maximum throughput, the same net rate (throughput) is achieved for more than one gross rate. At the lower gross rate the relative amount of retransmissions is inferior to the relative amount of retransmissions at the higher gross rate.

When retransmissions become a substantial amount of all transmissions, the users will perceive a low quality of service due to increased average delays. There will also be a greater delay variance as each packet may require multiple retransmissions to get through without errors. For short instances the user might then imagine the connection being broken.

A WCDMA system will be designed to interact with e.g. the Internet. Most applications on the Internet use protocols, such as TCP (Transport Control Protocol), that controls the transmission rate, based on link quality in terms of packet loss and delay characteristics. Consequently, besides the negative effect of retransmission delays as such on perceived quality, substantial queuing delay can also lead to secondary effects further reducing quality of service. An obvious solution to these secondary effects is to develop a modified TCP less sensitive of the increased number of retransmissions typical of, e.g., wireless systems. However, this is greatly undesirable as it may introduce problems to user applications.

At high load it is consequently a goal to operate a system close to its maximum throughput, to make best use of scarce resources. At low load the system throughput is not a scarce resource and therefore there is no reason to optimize system for maximum throughput but for perceived quality.

FIG. 1 illustrates a situation with a received signal strength that does not vary, or does not vary very much, in relation to an overall noise and interference level. A modern communication system makes use of transmission power control to keep received signal to interference ratio close to a constant target ratio, where the target is preset to a fix level.

Figure 2:
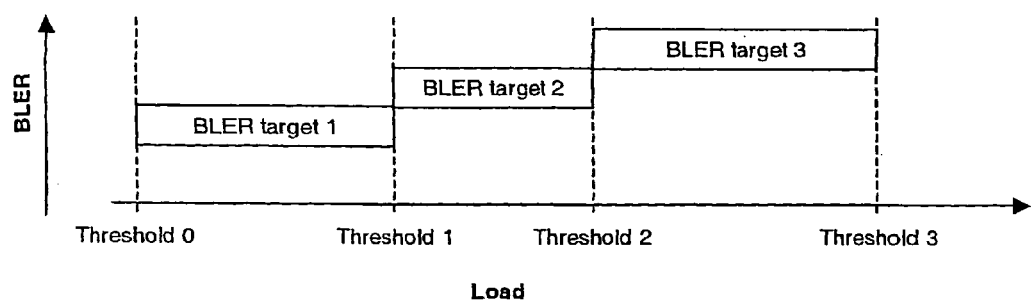
FIG. 2 shows target block error rates versus load, according to the invention.

As explained above it is advantageous to operate a system at various retransmission rates depending on load. As packets detected to be in error are retransmitted the retransmission rate is reflected into a block error rate, BLER. This invention utilizes different BLER targets for different load levels. This is illustrated in FIG. 2. At a high load situation between thresholds 2 and 3, a high BLER target, BLER target 3, is used. BLER target 3 corresponds to an operational setting close to maximum throughput of FIG. 1. At a low load situation between thresholds 0 and 1, a small BLER target is used to guarantee a high user quality, where maximum system throughput is less critical. For intermediary loads between thresholds 1 and 2 an intermediary BLER target, BLER target 2, is used.

One or more BLER targets are evaluated at the receiving end. If the number of erroneous packets exceeds the BLER target, transmission power needs to be increased, everything else being equal. Consequently, the receiving end should command a transmission power increase. Correspondingly, if the BLER is less than the BLER target, transmission power should be commanded to decrease. BLER targets are set or determined in relation to traffic load as previously described in relation to FIG. 2. BLER targets are communicated as needed for closed loop evaluation.

As described in relation to FIG. 1, the objective of transmission power control is to maintain receiver signal to interference ratio, SIR, close to constant. This constant is an SIR target. In order to achieve the desired transmission power control, the BLER target selection affects the SIR target to be used for the transmission power control, i.e. BLER is controlled indirectly.

Figure 3:
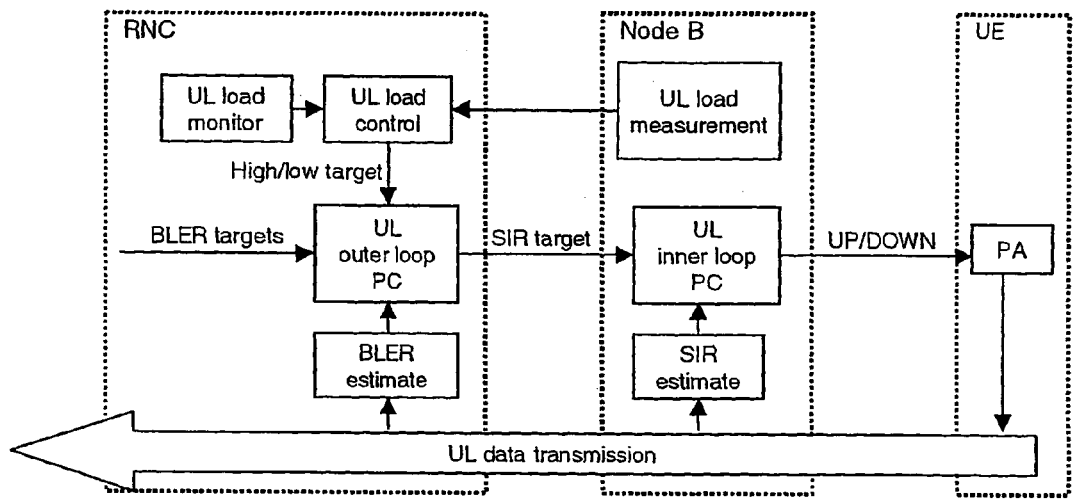
FIG. 3 schematically illustrates uplink control, according to the invention.

FIG. 3 illustrates an embodiment for uplink control according to the invention. A radio network controller, RNC, determines a set of BLER targets, e.g. BLER targets 1–3 of FIG. 2. As examples only, BLER targets in the range of 1–30%, depending on traffic load, demonstrate high efficiency. Offered uplink load is set in the RNC in means <<UL load monitor>> and received BLER is achieved from uplink data transmission in means <<BLER estimate>>. Means <<UL load control>> determines which BLER target from the set of BLER targets to use by indicating by selector <<High/low target>> if BLER target should be increased or decreased. Of course, alternative ways of indicating which particular BLER target from the set of BLER targets to select also falls within the scope of this invention. The module <<UL load control>>, located in the RNC, receives information on the uplink load, preferably from a base station entity <<Node B>>. This can originate from measurements, e.g. Received Signal Strength Indicator, RSSI, or from other traffic observations, such as counting number of connections. From the BLER estimate, the BLER target, optionally also including the old BLER target/old SIR target for which the BLER estimate is determined, a target <<SIR target>> to be used is calculated or looked up. This is performed by the uplink outer loop power control means <<UL outer loop PC>>.

A base station <<Node b>> comprises means for uplink load measurements, as explained above. It also comprises means <<UL inner loop PC>> for inner loop uplink transmission power control and means <<SIR estimate>> for estimating uplink signal to interference ratio. Means <<UL inner loop PC>> compares <<SIR target>>, achieved from RNC, and estimated SIR on uplink, achieved from means <<SIR estimate>>, and commands a user equipment UE to increase or decrease transmission power in a power amplifier PA depending on the outcome of the comparison. BLER and SIR will be estimated in the RNC and <<Node B>>, respectively, on data transmitted with the controlled transmission power, closing the inner and outer loops.

The set of BLER targets as determined by the RNC, can be determined individually for each connection or only one set of BLER targets is determined for all, or a subset of all, connections of the RNC. Also the SIR target can be determined individually for each connection or only one SIR target is determined for all, or a subset of all, connections of the Node B. In UMTS Radio Access Bearers, RABs, make available radio resources (and services) to user applications. For each mobile station there may be one or several RABs. Each RAB is associated with a class of Quality of Service, QoS. When selecting individual BLER targets it is preferred to select BLER target and, correspondingly, SIR target in accordance with the QoS class for an RAB.

Basically, the load control as described for uplink in relation to FIG. 3 is also applicable for downlink, with the obvious interchange of up and down, and <<Node B>> and UE, respectively. However, there are some differences due to the fact that BLER targets are determined on the Radio Access Network side, RAN side, preferably in the RNC and the load measurements are likewise determined on the RAN side, preferably in the <<Node B>>. This will have repercussions on how the BLER target for determining SIR target is communicated to the UE.

Figure 4:
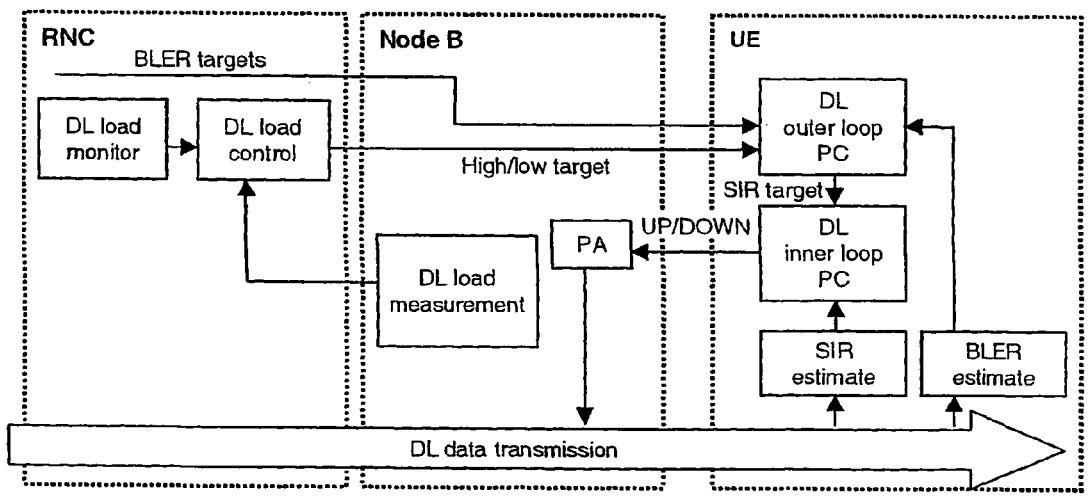
FIG. 4 shows a block diagram of one embodiment of downlink load control, according to the invention.
Figure 5:
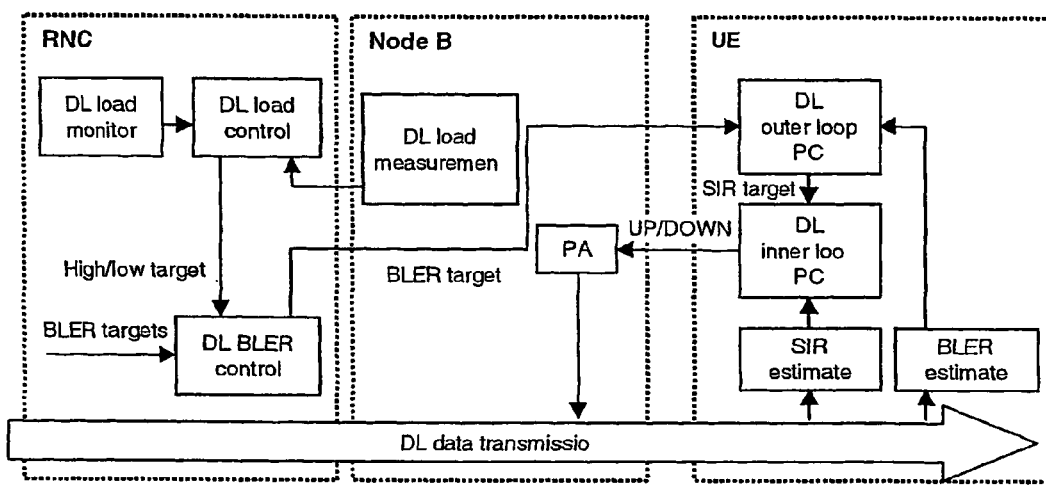
FIG. 5 displays a block diagram of another embodiment of downlink load control, according to the invention.

FIGS. 4 and 5 show two embodiments of downlink load control. In FIG. 4, a complete set of BLER targets is transferred to the UE and, depending on the downlink load control, a target selector is communicated, indicating which BLER target of the stored set of BLER targets to use. Since the set of BLER targets only need to be transferred at connection setup or is updated infrequently, signaling could be reduced as compared to a solution where the BLER target to use is communicated. A block diagram of such a solution is illustrated in FIG. 5. If the respective BLER target elements of the set of BLER targets are changed frequently, or the DL load control is designed to only infrequently switch between the various BLER targets of a set of BLER targets, the solution according to FIG. 5 will perform more efficiently.

According to both FIGS. 4 and 5, offered downlink load is set in the RNC in means <<UL load monitor>>. The RNC determines a set of BLER targets. As for uplink load control, <<Node B>> comprises means <<DL load measurement>> for determining actual downlink load. The downlink load can e.g. be estimated from the downlink Transmitted Carrier Power or from traffic observations. Means <<DL load control>> determines whether BLER target should increase or decrease, depending on downlink load measured, as described above in relation to FIG. 2. Means <<DL outer loop PC>> calculates a target signal <<SIR target>> input to means <<DL inner loop PC>> determining downlink inner loop power control. If means <<SIR estimate>> indicates a downlink SIR less than target <<SIR target>>, means <<DL inner loop PC>> commands the power amplifier PA of <<Node B>> to increase transmission power. If estimated downlink SIR is greater than target <<SIR target>>, PA is commanded to decrease transmission power. Means <<DL outer loop PC>> receives a signal indicating estimated BLER from means <<BLER estimate>>.

FIG. 4 shows an embodiment where the entire set <<BLER targets>> of BLER targets is transferred from the RNC to the UE. For-selection of the particular BLER target to use in selecting an SIR target also a selector <<High/low target>> is communicated to the UE. Preferably the signal carrying selector <<High/low target>> is broadcast in a system information message when the same BLER target is used for all connections. In the UE, means <<DL outer loop PC>> determines which BLER target to use from the set of BLER targets as indicated by the selector <<High/low target>>. This BLER target is further compared with the estimated downlink BLER. If estimated BLER is less than the selected BLER target, the SIR target is reduced. If estimated BLER is greater than the selected BLER target, the SIR target is increased.

The embodiment of FIG. 5 transfers a selected BLER target from RNC to UE via <<Node B>>. In the RNC a target signal <<BLER target>> is determined in means <<DL BLER control>>. Target signals <<High/low target>> and <<BLER targets>>, determined as described above, are input to means <<DL BLER control>>. This means for downlink BLER control selects a particular BLER target from the set of BLER targets accordingly. In the UE the BLER target carried by signal <<BLER target>> is input to means <<DL outer loop PC>> for comparison with estimated BLER from means <<BLER estimate>>. Depending on the outcome of this comparison, an SIR target is determined as described above.

A person skilled in the art readily understands that the receiver and transmitter properties of a <<Node B>> or a UE are general in nature. The use of concepts such as <<Node B>>, UE or RNC within this patent application is not intended to limit the invention only to devices associated with these acronyms. It concerns all devices operating correspondingly, or being obvious to adapt thereto by a person skilled in the art, in relation to the invention. As two explicit non-exclusive examples, the invention relates to mobile stations without a subscriber identity module, SIM, as well as user equipment including one or more SIMs and physical entities, base stations, as well as the logical nodes, Nodes B, they represent. Further, protocols and layers are referred to in relation to UMTS terminology. However, this does not exclude applicability of the invention in other systems with other protocols and layers of similar functionality.

The invention is not intended to be limited only to the embodiments described in detail above. Changes and modifications may be made without departing from the invention. It covers all modifications within the scope of the following claims.

The invention claimed is:

1. A method of link load control in a communications system using automatic repeat request, the method characterized in that transmission power is controlled including determining at least two targets, the first target being related to a target received signal strength, interference level or noise level, and the second target being related to a block error rate, and in that one or more signals carrying information on a set of second targets are transmitted to the user equipment from a radio access network.

2. The method according to claim 1 characterized in that the second target is selected from the set of second targets related to block error rates.

3. The method according to claim 1 characterized in that the second target is selected depending on traffic load.

4. The method according to claim 1 characterized in that the first target is determined in relation to the second target.

5. The method according to claim 1 characterized in that for uplink load control a network element determines the first target depending on the difference between the selected second target and an actual value, corresponding to the second target, estimated from uplink data transmissions.

6. The method according to claim 1 characterized in that for downlink load control a user equipment determines the first target depending on the difference between the selected second target and an actual value, corresponding to the second target, estimated from downlink data transmissions.

7. The method according to claim 1 characterized in that the load control is closed loop control.

8. The method according to claim 1 characterized in that the first target is target received signal strength, interference level, noise level, signal to interference ratio, signal to noise ratio, or a combination thereof.

9. The method according to claim 1 characterized in that the second target is target received block error rate or retransmission rate.

10. Radio communication system comprising means for carrying out the method in claim 1.

11. A method of link load control in a communications system using automatic repeat request, the method characterized in that transmission power is controlled including determining at least two targets, the first target being related to a target received signal strength, interference level or noise level, and the second target being related to a block error rate, and in that one or more signals carrying selector information for selection of a second target from a set of second targets are transmitted to the user equipment from a radio access network.

12. A method of link load control in a communications system using automatic repeat request, the method characterized in that transmission power is controlled including determining at least two targets, the first target being related to a target received signal strength, interference level or noise level, and the second target being related to a block error rate, and in that one or more signals carrying a selected second target from a set of second targets are transmitted to the user equipment from a radio access network.

13. A method of link load control in a communications system using automatic repeat request, the method characterized:

in that transmission power is controlled including determining at least two targets, the first target being related to a target received signal strength, interference level or noise level, and the second target being related to a block error rate;

in that for downlink load control a user equipment determines the first target depending on the difference between the selected second target and an actual value, corresponding to the second target, estimated from downlink data transmission; and in that one or more signals are broadcast.

14. A first network element in a communication system using automatic repeat request, the first network element comprising:

means for link load control including means for determining at least two targets, the first target being related to a target received signal strength and the second target being related to a block error rate;

means for uplink load monitor of offered traffic load;

means for reception of first measurement data;

means for comparing offered traffic load and first measurement data;

means for delivering a second target selector signal depending on the outcome of the comparison of the offered traffic load and the first measurement data; and means for determining the first target depending on the relation between the second target and the second measurement data.

15. The first network element according to claim 14 further comprising means for selecting a second target out of a set of second targets by means of a second target selector signal.

16. The first network element according to claim 14 further comprising means for comparing the selected second target and second measurement data.

17. The first network element according to claim 14 further comprising means for transmitting one or more signals carrying the first target to a second network element.

18. The first network element according to claim 14 wherein the first measurement data reflects actual traffic load.

19. The first network element according to claim 14 wherein the first measurement data is received signal strength or transmitted power.

20. The first network element according to claim 14 wherein the second measurement data is block error rate or retransmission rate.

21. The first network element according to claim 14 wherein the third measurement data is signal strength, interference level, noise, level signal to interference ratio, signal to noise ratio, or a combination thereof.

22. The first network element according to claim 14 wherein the first target is target received signal strength, interference level, noise, level signal to interference ratio, signal to noise ratio, or a combination thereof.

23. The first network element according to claim 14 wherein the second target is target received block error rate or retransmission rate.

* * * * *